(12) United States Patent
Bong

(10) Patent No.: US 8,110,772 B1
(45) Date of Patent: Feb. 7, 2012

(54) SYSTEM AND METHOD FOR MULTI-PASS COMPUTER CONTROLLED NARROW-GAP ELECTROSLAG WELDING APPLICATIONS

(76) Inventor: William L. Bong, Walnut Creek, CA (US)

(*) Notice: Subject to any disclaimer, the term of this patent is extended or adjusted under 35 U.S.C. 154(b) by 86 days.

(21) Appl. No.: 12/621,750

(22) Filed: Nov. 19, 2009

Related U.S. Application Data

(60) Provisional application No. 61/183,715, filed on Jun. 3, 2009.

(51) Int. Cl.
*B23K 25/00* (2006.01)
(52) U.S. Cl. ...................................................... 219/73.1
(58) Field of Classification Search .................. 219/73.1, 219/73.11, 73.2, 73.21, 76.1, 76.14, 72, 126, 219/145.1, 145.23, 5, 3, 54, 73, 137 R
See application file for complete search history.

(56) References Cited

U.S. PATENT DOCUMENTS

| | | | | |
|---|---|---|---|---|
| 3,518,397 A | * | 6/1970 | Hannahs | 219/73.1 |
| 3,565,994 A | * | 2/1971 | Jackson | 373/50 |
| 3,602,688 A | * | 8/1971 | Sibley | 219/137 R |
| 3,684,001 A | * | 8/1972 | Wooding et al. | 164/515 |
| 3,854,028 A | * | 12/1974 | Uttrachi et al. | 219/126 |
| 4,038,515 A | * | 7/1977 | Risberg | 219/130.33 |
| 2001/0045420 A1 | * | 11/2001 | Bong et al. | 219/125.1 |
| 2008/0061039 A1 | * | 3/2008 | Danks et al. | 219/73.1 |

FOREIGN PATENT DOCUMENTS

| | | | |
|---|---|---|---|
| JP | 58-061990 | * | 4/1983 |
| JP | 58-187286 | * | 11/1983 |

* cited by examiner

*Primary Examiner* — Henry Yuen
*Assistant Examiner* — Thien S Tran
(74) *Attorney, Agent, or Firm* — Charles L. Thoeming

(57) ABSTRACT

A system and method of multi-pass computer controlled narrow-gap Electroslag welding allowing a faster vertical rate of rise at a much lower voltage, and that includes welding selected narrow-gaps within segments of a weld cavity between heavy plate steel workpieces and attendant control of the heat transfer depth penetration from the weld puddle to the workpieces according to a pre-determined profile resulting in a smaller heat affected zone and smaller grain structure in the weld metal.

7 Claims, 8 Drawing Sheets

HEAT INPUT CALCULATIONS: COMPARISON BETWEEN STANDARD ONE PASS VERSUS MULTI-PASS

| Plate Thickness | Number of Passes | TYPE Guide Tube | Number of Guide Tubes | Number of Wires | Welding Volts | Welding Amperage | Vertical Rate of Rise | Heat Input KJ / in | NOTES |
|---|---|---|---|---|---|---|---|---|---|
| 3 | 1 | 2 1/2 | 1 | 2 | 39 | 1,450 | 1.5 | 2,262 | |
| 3 | 2 | 1 1/4 | 1 | 2 | 34 | 950 | 2 | 969 | 1 |
| 6 | 1 | 2 1/2 | 2 | 4 | 39 | 1,600 | 0.9 | 4,160 | |
| 6 | 5 | 1 1/4 | 1 | 2 | 34 | 950 | 2 | 969 | 1 |
| 9 | 1 | 2 1/2 | 3 | 6 | 39 | 2,600 | 0.5 | 12,168 | |
| 9 | 7 | 1 1/4 | 1 | 2 | 34 | 950 | 2 | 969 | 1 |

NOTE:
1 ALL MULTI-PASS WELDING PARAMETERS ARE THE SAME; THUS, THE SAME HEAT INPUT

Fig. 13

SYSTEM AND METHOD FOR MULTI-PASS COMPUTER CONTROLLED NARROW-GAP ELECTROSLAG WELDING APPLICATIONS

CROSS-REFERENCES TO RELATED APPLICATIONS

This United States non-provisional patent application is based upon and claims the filing date of U.S. provisional patent application Ser. No. 61/183,715 filed Jun. 3, 2009.

STATEMENT REGARDING FEDERALLY SPONSORED RESEARCH OR DEVELOPMENT

None.

REFERENCE TO A MICRO-FICHE APPENDIX

None.

TECHNICAL FIELD

This invention relates to welding. More particularly, the invention is related to an automated system and method for narrow-gap multi-pass narrow-gap (⅜-inch to 1.00-inch gap) Electroslag/Electro-gas welding to achieve superior weld quality for improved toughness and ductility for welding heavy plate steel welding applications—including, but not limited to high rise-building fabrication, bridge fabrication, heavy wall pressure vessel fabrication, nuclear vessel manufacturing, offshore platform fabrication, and the like.

BACKGROUND OF THE INVENTION

My U.S. Pat. No. 6,297,472, issued Oct. 2, 2001(the "'472 patent"), discloses and claims a welding system and method comprising a distributed welding control system that allows a welding operator to program automated welding cycles for various welding operations, that is particularly useful for installing stiffener plates onto structural beams. In the '472 patent, the welding system comprises a welding fixture with a pair of opposing, positionally adjustable welding shoes, and lock screws for attaching a workpiece such as an I-beam. A rotary wire straightener removes the cast and helix from welding wire as it is fed to the welding torch. Straightening the welding wire prevents welding wire from fusing to the copper shoes and keeps the weld puddle in the center of the weld cavity in a manner that would interrupt the welding operation or cause a weld defect.

My U.S. Pat. No. 7,038,159, issued May 2, 2006 (the "'159 patent"), discloses and claims a system and method for Electroslag butt welding expansion joint rails comprising a distributed welding control system. The method includes defining a weld cavity with a first expansion joint rail, a second expansion joint rail, a plurality of gland shoes, and a pair of butt shoes, and can be adapted for welding an expansion joint rail to a support beam.

My U.S. Pat. No. 7,148,443, issued Dec. 12, 2006 (the "'443 patent"), discloses and claims a consumable guide tube comprising a thin first elongate strip, a second elongated strip, and a plurality of insulators. An embodiment of U.S. Pat. No. 7,148,443 comprises a thin first elongate strip which is a low carbon cold rolled steel strip, and a second elongated strip that is a low carbon hot rolled steel strip, and a second elongated strip that is a low carbon hot rolled steel strip is formed with one or more channels to allow the passage of the consumable welding wire. The guide tube of the '443 patent can also be configured to comprise two or more longitudinal channels.

My U.S. Patent Application Ser. No. 61/183,715 (the "'715 Application") filed Jun. 3, 2009, discloses improving Electroslag welding and Narrow Gap Electroslag welding applications using at least one square wave alternating current welding power supply.

The automated system and method for multi-pass computer controlled narrow-gap Electroslag welding applications combines certain disclosed and claimed features of my patents and/or patent applications described herein, and/or their divisional, continuation, or continuation-in-part progeny, to allow a welding operator to program automated welding cycles for welding heavy plate steel welding operations— including, but not limited to high rise-building fabrication, bridge fabrication, heavy wall pressure vessel fabrication, nuclear vessel manufacturing, offshore platform fabrication; and, as a result, these patents are particularly useful for an automated system and method for multi-pass computer controlled narrow-gap Electroslag/Electro-Gas welding applications.

DISCLOSURE OF INVENTION

Narrow Gap welding was developed under several contracts issued by the Federal Highway Administration (FHWA) to various universities and research institutions, with the purpose of improving toughness (charpy impact strength) for welding bridge flanges subjected to reversal stress loading. However, the welding process is now universally accepted and used on many applications other than bridge flanges. Today, all heavy plate applications that lend themselves to the Electroslag welding process ("ESW") are candidates for the narrow gap Electroslag welding process (referred to in the industry as: Narrow Gap Improved-ElectroSlag Welding ("NGI-ESW") and "ElectroSlag Welding-Narrow Gap ("ESW-NG").

With the narrow-gap Electroslag welding process, the two plates to be welded are spaced ¾-Inch apart. The two plates are bridged together on the bottom by a sump plate (where the molten weld puddle is formed). The two plates are bridged together on the top by welding a "square donut" plate that connects the two plates together. Air-cooled copper shoes are attached to either side of the gap to form a weld cavity. After the weld cavity is formed, a consumable guide tube is placed inside the weld cavity for NGI-ESW.

The welding wire is fed down two grooves in the consumable guide tube to the weld puddle. The consumable guide tube is connected to the welding machine via heavy duty copper power cables. When welding power is turned on, the consumable guide tube transfers the power amperage and voltage (wattage) necessary to make the weld. Prior to starting the weld cycle, a granular flux material is dumped into the weld cavity and falls to the bottom of the sump. When the welding wire starts to feed, an arc is struck in the sump area. The welding arc provides sufficient wattage during the weld start to melt the granular welding flux. The flux then becomes molten and floats on top of the molten weld metal. The molten flux is heated to approximately 3500 degrees Fahrenheit. Wire feeding through the molten flux is immediately melted and falls through the molten flux in droplet form to the molten steel puddle below the molten flux puddle. Since the molten flux is lighter than steel, it floats on top of the molten steel puddle.

Wire continues to feed and both the molten flux and molten steel puddles continues to rise. As the puddle rises, the molten flux, at 3500 degrees Fahrenheit, melts the surface of the two plates being joined. As the two puddles continue to rise, the molten weld metal begins to solidify, thus welding the two plates together.

Narrow-gap Electroslag welding procedures are presently done in one single-pass vertical welding operation, generating a great deal of heat into the parent material. The thicker the parent material, the greater amount of wattage required to join two plates together. The longer the plates are held at high temperatures, the worse the weld physicals become. Thinner plates require smaller amounts of heat to join the two plates together; thicker plates require much greater amounts of heat to join them together. The higher the heat input, the slower the cooling rate. Slower cooling rates are the second reason for poor test results. Very high heat inputs and slow cooling rates create an extremely large heat affected zones ("HAZ") that lowers the quality of the parent material in the HAZ. In an attempt to overcome the excessive heat input problem, narrow-gap welding researchers used water-cooled copper shoes first, to reduce the total amount of heat input to the parent material and second, to chill the weld puddle in an attempt to decrease the amount of time the weld metal was held at high temperatures.

Water-cooled copper shoes, at the outer edges of the weld cavity, tend to chill the molten weld metal to the copper shoes, chilling the molten weld meta before it can melt into the surface of the four corners of the weld cavity, thus causing incomplete fusion on the four corners of the weld cavity. The only way to overcome incomplete fusion is to substantially increase the welding voltage to overcome the high cooling generated by the water-cooled shoes. Higher voltages generate more wattage, thus more heat (especially in the center of a weld cavity, especially in plate thicknesses over 3.00-inches).

Slow cooling rates also create large grain structures in the solidified weld metal. Large grain structures also tend to lower the quality and toughness of the weld metal. To date, fabricators using the narrow-gap Electroslag welding process typically make the weld in a single pass because the process was developed as a single pass process. Narrow-gap Electroslag welds (in plate thickness from 0.75-inches, up to 3.00-inches thick) generally have sufficient toughness and ductility to pass the various welding codes with relative ease. Electroslag welds greater than 3.00-inches thick, however, have great difficulty in passing existing welding codes. The thicker the weld plate, the more difficult is to achieve acceptable results.

Arcmatic's™ computer controlled Electroslag welding processes trade name is the "Vertaslag™ Welding Process". Arcmatic™ has also developed a new version of its computer controlled narrow-gap welding process that incorporates a multi-pass welding technique. This method of narrow-gap welding employs water-cooled copper welding shoes, air-cooled copper welding shoes, or articulated air-cooled copper welding shoes. One of the advantages of using air-cooled copper shoes is that the air flow can be adjusted during the welding operation to maintain a constant shoe temperature. The air-flow in the copper shoe allows the shoe temperature to go as high as 1000 degrees Fahrenheit. The air-cooled copper shoe temperature range for the preferred embodiment of automated system and method for multi-pass computer controlled narrow-gap Electroslag welding applications is 800 degrees Fahrenheit to 1000 degrees Fahrenheit. The temperature of water cooled shoes cannot be allowed to go higher than 212 degrees Fahrenheit because at this temperature the heat starts generating steam, generating a "vapor lock" which stops the flow of water, causing the temperature of the copper to rise to the melting point, and stopping the weld. When the air-cooled copper welding shoes, or articulated air-cooled copper welding shoes are allowed to become hotter, the high voltage necessary to get the weld to blend into the corners of the weld cavity can be substantially lowered, thus reducing the total heat input into the parent material and reducing the grain size in the weld metal, thus improving the weld toughness and ductility.

Arcmatic's VertaSlag welding process employs a square wave welding power supply to perform its VertaSlag (ESW-NG) welding processes. Multipass VertaSlag welds are primarily performed using square wave AC welding power supplies. The square wave can be created with SCRs, IGBTs or any other DC device to generate the AC square wave. Multipass VertaSlag welds can also be generated by using constant current power supplies, constant voltage power supplies, and DC power supplies connected "Electrode Positive" ("DCEP")—also referred to as DC Reverse Polarity; and connected "Electrode Negative" ("DCEN")—also referred to as DC Straight Polarity. Extensive research comparing Narrow Gap Electroslag welding (ESW-NG), using Constant Voltage DC welding power supplies as opposed with Square Wave AC welding power supplies has been compiled and reported.

Subsequent studies of welds made with Constant Voltage DC power supplies compare the heat generated by DCEP with DCEN. These studies show that welding with DCEP always ran much hotter than welding DCEN. It was further discovered that welding with the DC power supply always created a strong magnetic field that tended to pull the penetration of the weld puddle to one side or the other, depending on the direction of the magnet field.

VertaSlag (ESW-NG) welds using a square wave AC welding power supply tend to reduce, or eliminate the magnetic field problem. Associated consumable guide tube assemblies no longer have a strong magnetic pull that tends to deflect the assembly from the center of the weld cavity. When the guide tube is deflected, the weld penetration can be pulled in the direction of the bend. The Square Wave AC welding power supply reduced, or eliminated the magnetic field, and the welds tend to stay in the weld cavity center, with balanced penetration on all sides of the weld cavity for VertaSlag (ESW-NG).

It was discovered that any given amperage and voltage condition (wattage) input to the ESW molten flux, covering the molten steel welding puddle, substantially reduces the total heat input into the parent material. It has been observed that the DCEP half cycle of the AC Square Wave produces higher heat input into the parent material, and the DCEN produces lower heat input into the parent material. Therefore having the ability of setting the time cycle of the of DCEP, as opposed to DCEN allows adjustment of the heat input to the parent material to more closely control the shape of the weld bead, and thus the amount of base metal dilution of the resultant weld puddle. Research and development continue to confirm these conditions.

Research indicates that VertaSlag (ESW-NG) welding with a square wave AC welding power supply controls the weld bead shape, minimizes the base metal dilution, reduces the total heat input into the parent material, and the reduces or eliminates any magnetic field. Arcmatic, for the first time in welding history has use a square wave Constant voltage AC welding power supply to produce ESW, NGI-ESW and ESW-NG welds. The Constant Voltage allows the operator to increase or decrease the voltage to correspondingly increase or decrease base metal dilution. Control of base metal dilution directly controls the quality of the weld, since controlling the total heat input into the parent material reduces the grain size and produces a higher quality weld.

When making a multi-pass Electroslag weld using the system and method for multi-pass computer controlled narrow-gap Electroslag welding applications, a "Butt-weld copper shoe" shoe can be placed on one side of the weld cavity and an "Insert-weld copper shoe" can be placed inside the weld cavity to limit the width of each weld width. If the weld width for each pass is limited to 1.50-inches, the amount of heat input for each pass is reduced substantially. This method allows the welding operator to weld at a much faster "Vertical Rate of Rise" (VRR), and at a much lower voltage, thus substantially reducing the total heat input for each weld pass. The result is a smaller HAZ, and a much smaller grain size providing consequently better impact values (Charpy), elongation, tensile strength, and yield.

BRIEF DESCRIPTION OF DRAWINGS

These and other features, aspects, and advantages of the present invention will become better understood with regard to the following description, appended claims, and accompanying drawings as further described. The sequence of weld passes illustrated in the following drawing by no means should limit the number and sequence of weld passes possible with this new multi-pass VertaSlag welding method. The same multi-pass type of sequence can be used ob both full penetration welds, partial penetration welds, and large fillet and groove welds. The following drawing figures are attached to this document.

FIG. 13 is a table of heat input calculations comparing single pass and multi-pass welds for similar heavy plate workpieces ranging from 3 inch to 9 inch plate thickness.

BEST MODE FOR CARRYING OUT THE INVENTION

Figure 1:
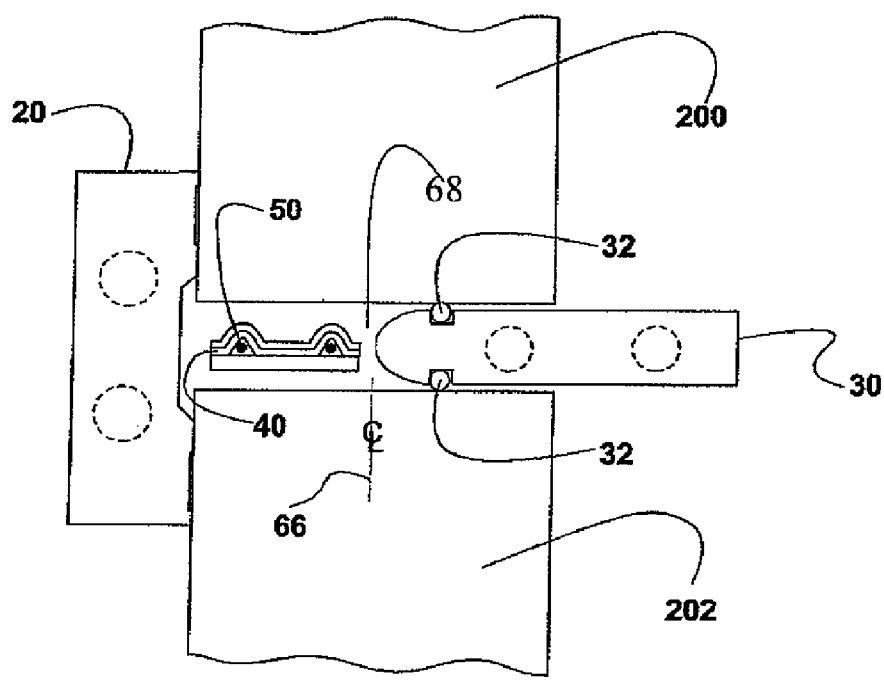
FIG. 1 is a top view of an embodiment of improved system and method for multi-pass computer controlled narrow-gap Electroslag welding applications showing the first pass step in welding a 0.75 inch gap between dual 3 inch plate workpieces, 200 and 202, including an insert-weld copper welding shoe 30 and insert-weld copper shoe cable gaskets 32, a butt-weld copper welding shoe 20, a consumable guide tube element 40 of a Vertaslag™ welding system having dual welding wires 50 within a weld cavity 68.
Figure 2:
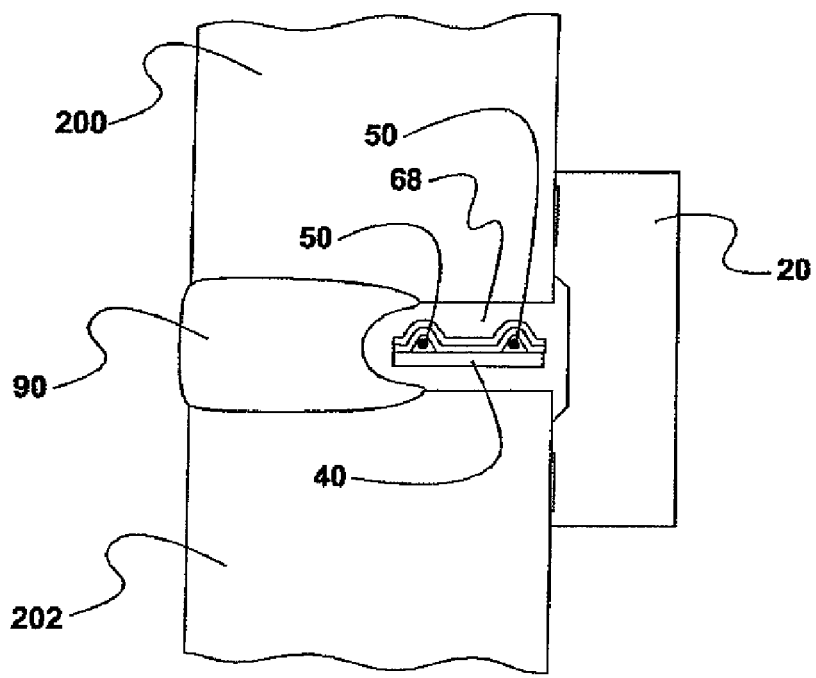
FIG. 2 is a top view of an embodiment of improved system and method for multi-pass computer controlled narrow-gap Electroslag welding applications showing the second pass step in welding a 0.75 inch gap between dual 3 inch plate workpieces, 200 and 202, after the weld 90 of FIG. 1 is completed, including a butt-weld copper welding shoe 20, a consumable guide tube element 40 of a Vertaslag™ welding system having dual welding wires 50 within a weld cavity 68.
Figure 3:
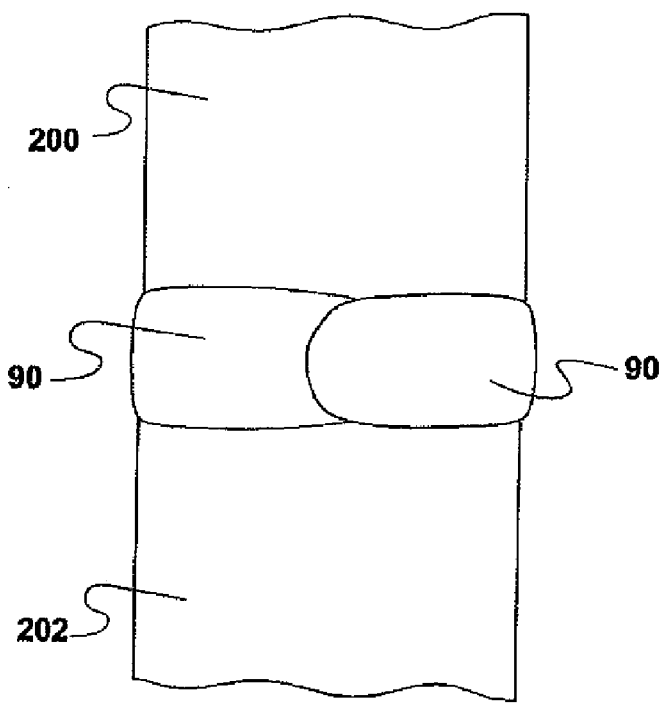
FIG. 3 is a top view of an embodiment of improved system and method for multi-pass computer controlled narrow-gap Electroslag welding applications showing the completed first pass weld 90 and second pass weld 90 of FIGS. 1 and 2, between 3 inch plate workpieces, 200 and 202.
Figure 4:
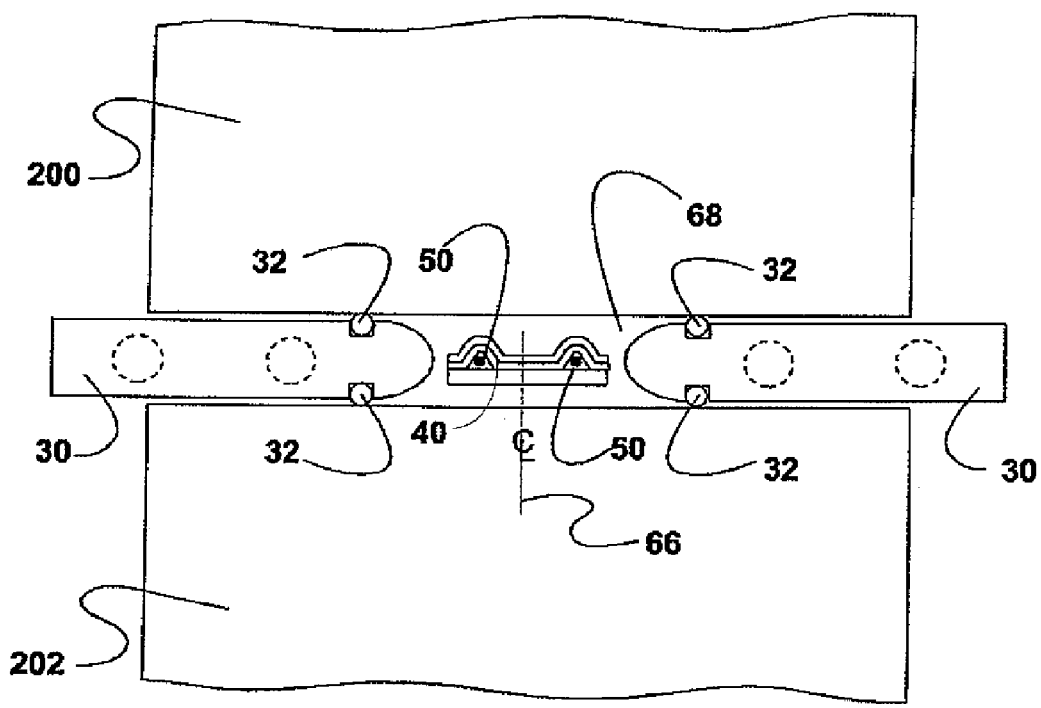
FIG. 4 is a top view of an embodiment of improved system and method for multi-pass computer controlled narrow-gap Electroslag welding applications showing the first pass step in welding a 0.75 inch gap between dual 6 inch plate workpieces, 200 and 202, including dual insert-weld copper welding shoes 30 and insert-weld copper shoe cable gaskets 32, a consumable guide tube element 40 of a Vertaslag™ welding system having dual welding wires 50 within a weld cavity 68.
Figure 5:
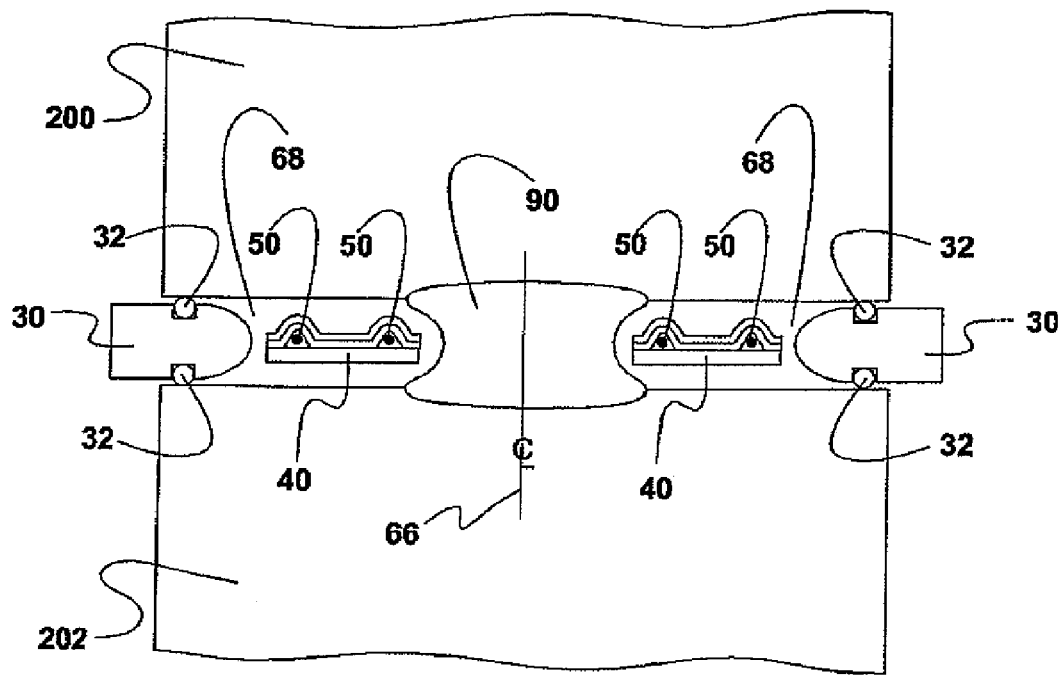
FIG. 5 is a top view of an embodiment of improved system and method for multi-pass computer controlled narrow-gap Electroslag welding applications showing the second pass step in welding a 0.75 inch gap between dual 6 inch plate workpieces, 200 and 202, after the weld 90 of FIG. 4 is completed, including dual insert-weld copper welding shoes 30 and insert-weld copper shoe cable gaskets 32, consumable guide tube elements 40 of a Vertaslag™ welding system having dual welding wires 50 within dual weld cavities 68.
Figure 6:
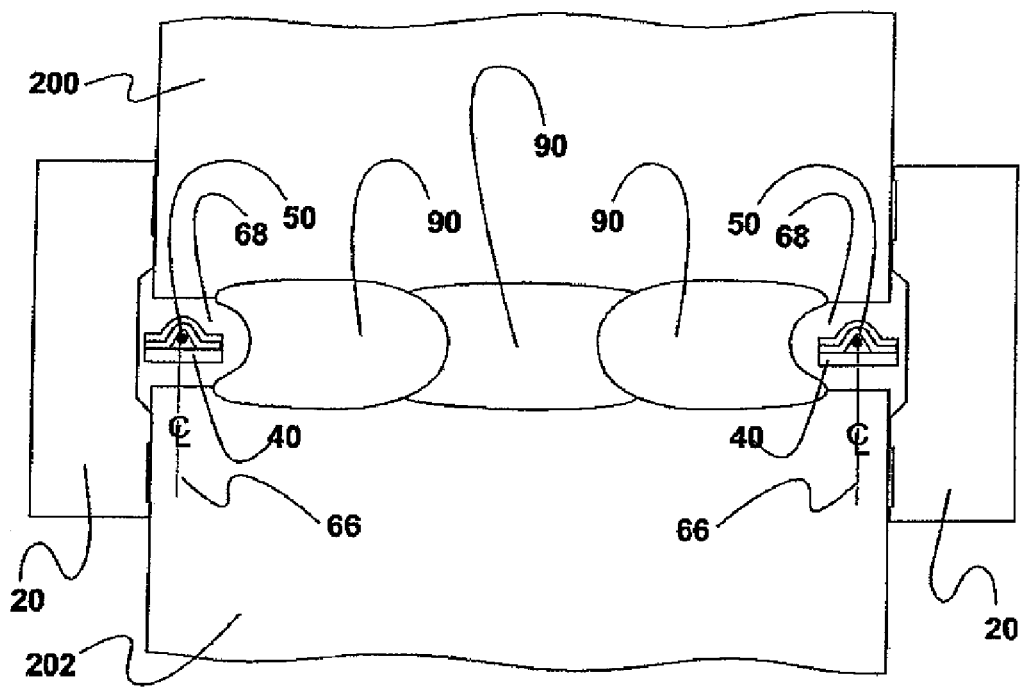
FIG. 6 is a top view of an embodiment of improved system and method for multi-pass computer controlled narrow-gap Electroslag welding applications showing the completed first pass and second pass welds of FIGS. 4 and 5, and showing the third pass step in welding a 0.75 inch gap between dual 6 inch plate workpieces, 200 and 202, after the welds 90 of FIGS. 4 and 5 are completed, including dual butt-weld copper welding shoes 30 and insert-weld copper shoe cable gaskets 32, consumable guide tube elements 40 of a Vertaslag™ welding system having dual welding wires 50 within dual weld cavities 68.
Figure 7:
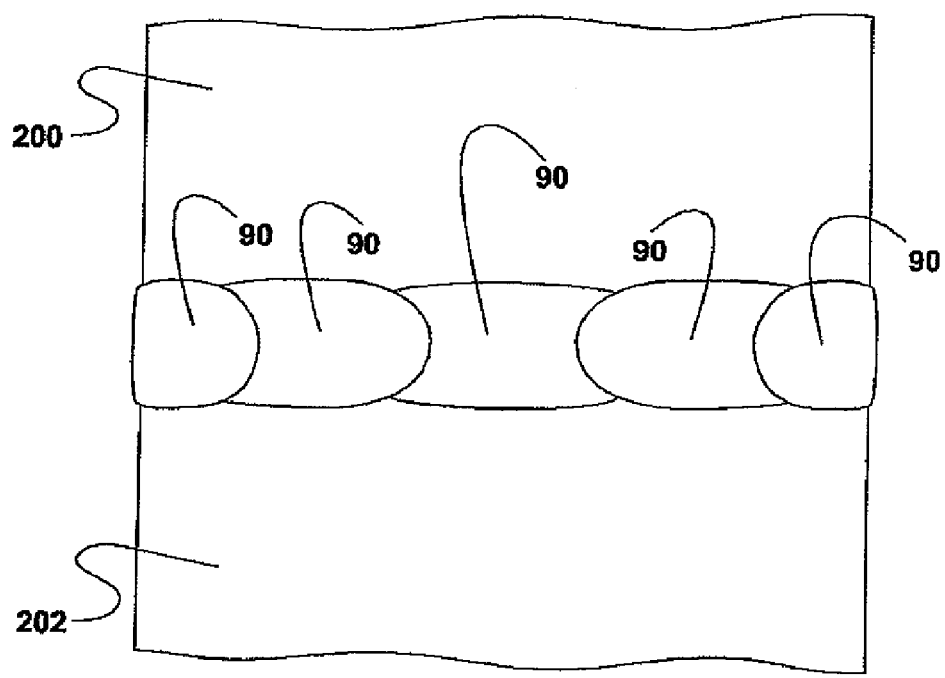
FIG. 7 is a top view of an embodiment of improved system and method for multi-pass computer controlled narrow-gap Electroslag welding applications showing the completed first pass, second pass, and third pass welds 90 of FIGS. 4, 5, and 6 are completed between dual 6 inch plate workpieces, 200 and 202.
Figure 8:
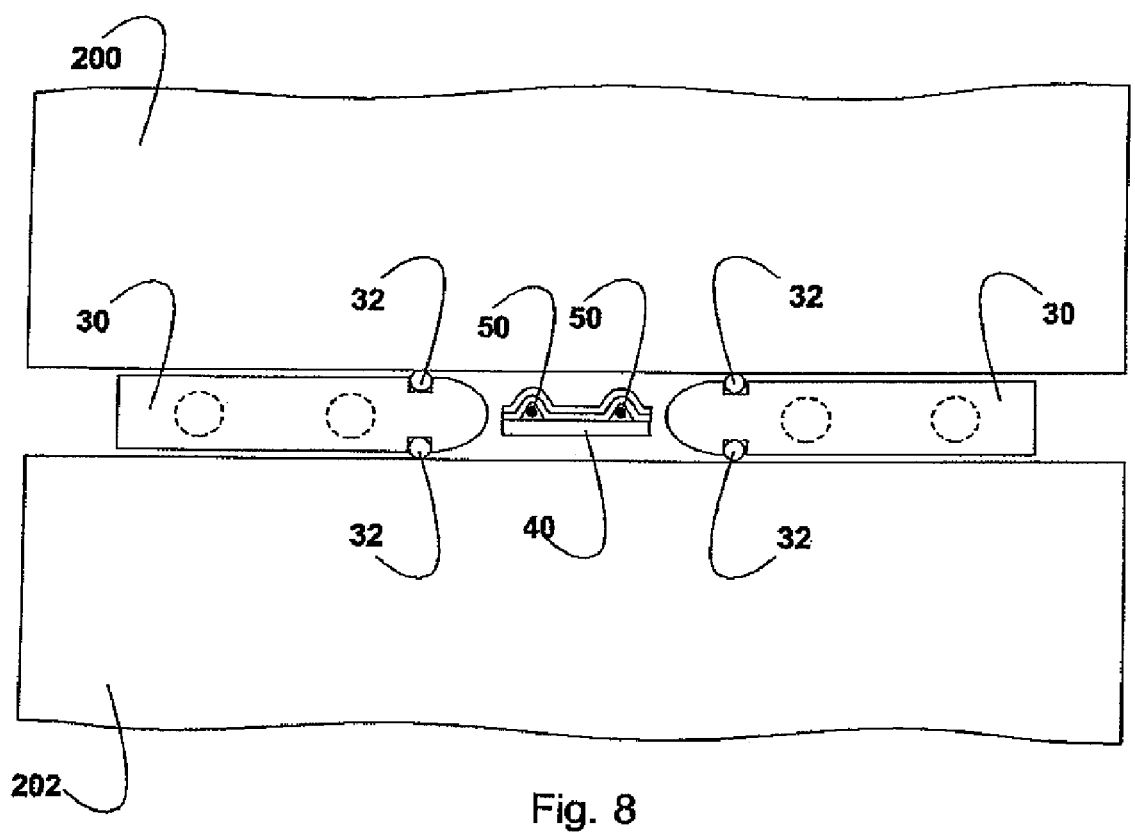
FIG. 8 is a top view of an embodiment of improved system and method for multi-pass computer controlled narrow-gap Electroslag welding applications showing the first pass step in welding a 0.75 inch gap between dual 9 inch plate workpieces, 200 and 202, including dual insert-weld copper welding shoes 30 and insert-weld copper shoe cable gaskets 32, a consumable guide tube element 40 of a Vertaslag™ welding system having dual welding wires 50 within a weld cavity 68.
Figure 9:
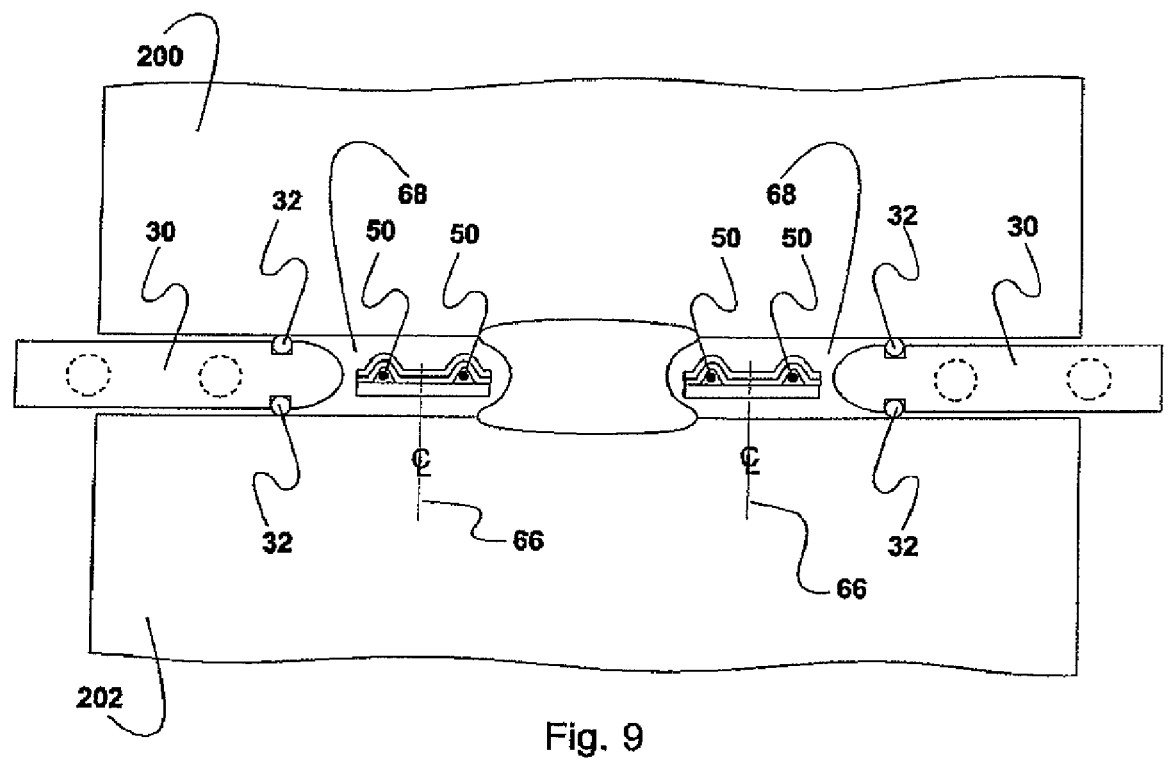
FIG. 9 is a top view of an embodiment of improved system and method for multi-pass computer controlled narrow-gap Electroslag welding applications showing the second pass step in welding a 0.75 inch gap between dual 9 inch plate workpieces, 200 and 202, after the weld 90 of FIG. 8 is completed, including dual insert-weld copper welding shoes 30 and insert-weld copper shoe cable gaskets 32, consumable guide tube elements 40 of a Vertaslag™ welding system having dual welding wires 50 within dual weld cavities 68.
Figure 10:
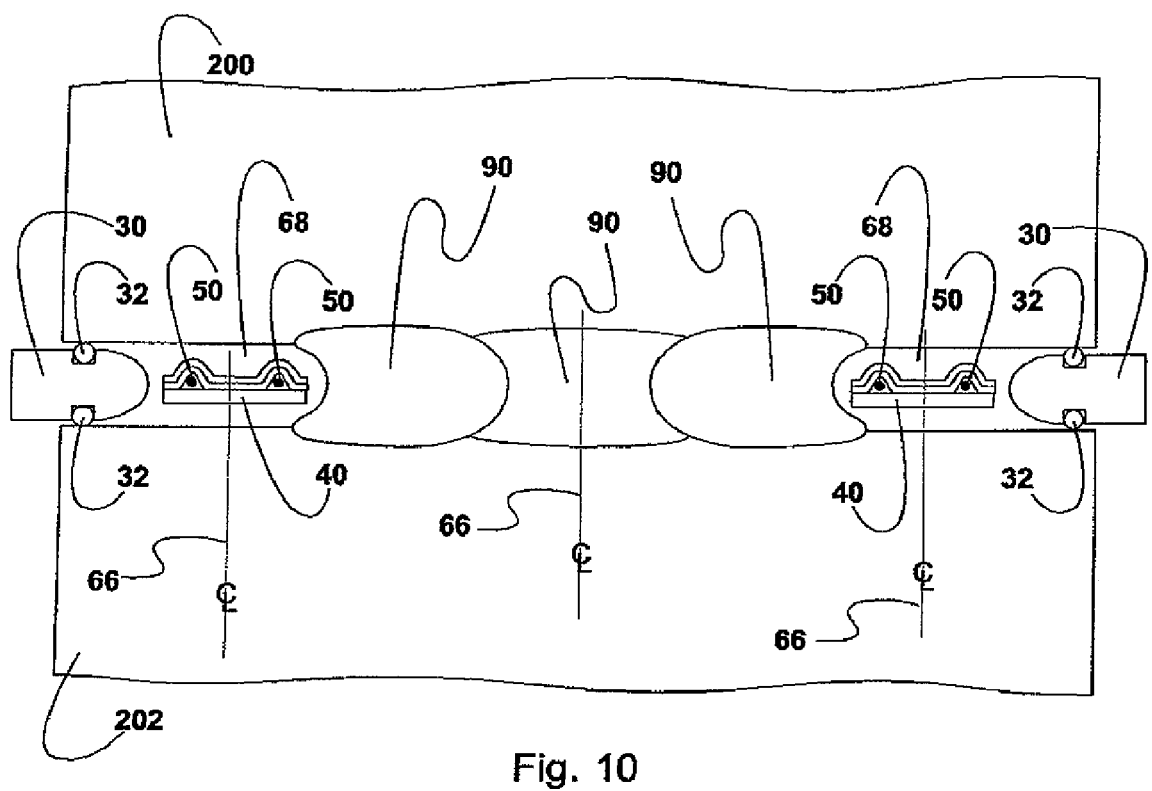
FIG. 10 is a top view of an embodiment of improved system and method for multi-pass computer controlled narrow-gap Electroslag welding applications showing the completed first pass and second pass welds 90 of FIGS. 8 and 9, and showing the third pass step in welding a 0.75 inch gap between dual 9 inch plate workpieces, 200 and 202, after the welds 90 of FIGS. 8 and 9 are completed, including dual insert-weld copper welding shoes 30 and insert-weld copper shoe cable gaskets 32, consumable guide tube elements 40 of a Vertaslag™ welding system having dual welding wires 50 within dual weld cavities 68.
Figure 11:
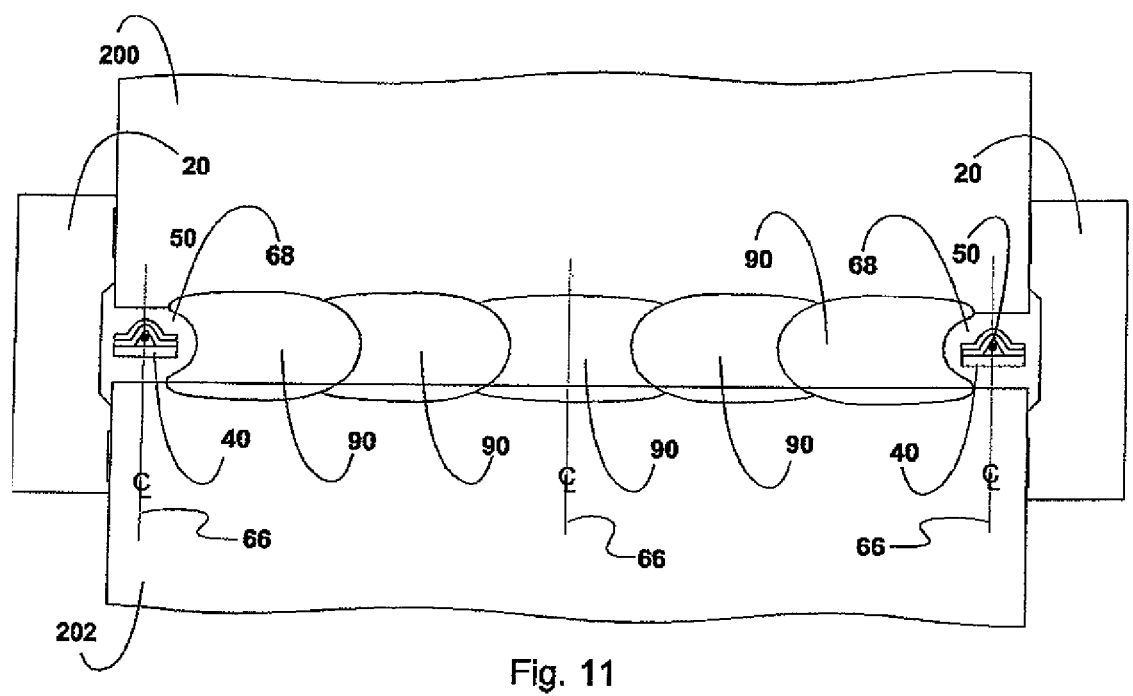
FIG. 11 is a top view of an embodiment of improved system and method for multi-pass computer controlled narrow-gap Electroslag welding applications showing the completed first pass, second pass, and third pass welds 90 of FIGS. 8, 9, and 10 showing the fourth pass step in welding a 0.75 inch gap between dual 9 inch plate workpieces, 200 and 202, after the welds 90 of FIGS. 8, 9, and 10 are completed, including dual butt-weld copper welding shoes 30 and insert-weld copper shoe cable gaskets 32, consumable guide tube elements 40 of a Vertaslag™ welding system having dual welding wires 50 within dual weld cavities 68.
Figure 12:
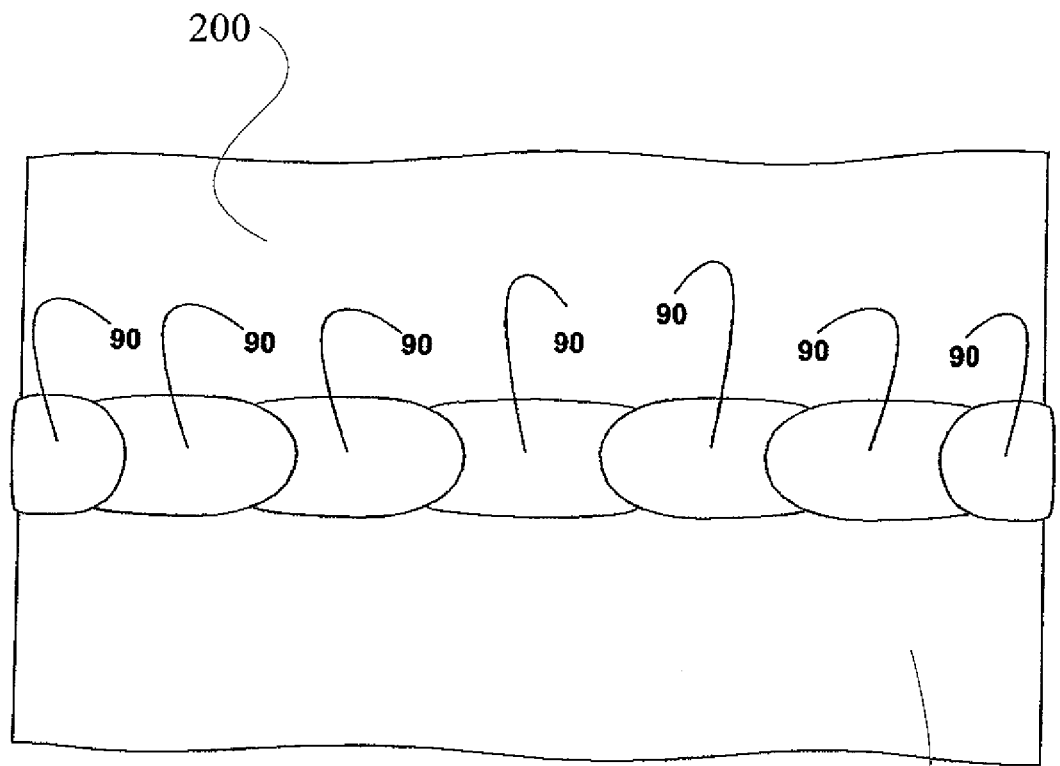
FIG. 12 is a top view of an embodiment of improved system and method for multi-pass computer controlled narrow-gap Electroslag welding applications showing the completed first pass, second pass, third pass, and fourth pass welds 90 of FIGS. 8, 9, 10, and 11 are completed dual 9 inch plate workpieces, 200 and 202.

Referring more specifically to the drawings, for illustrative purposes the including, but not limited to, the system and method for multi-pass computer controlled narrow-gap Electroslag welding applications is embodied generally in FIGS. 1-15. It will be appreciated that the system may vary as to configuration and as to the details of the parts, and that the method of using the system may vary as to details and to the order of steps, without departing from the basic concepts as disclosed herein. The apparatus for the improved system and method for multi-pass computer controlled narrow-gap Electroslag welding applications is disclosed generally in terms of welding vertical columns, as this particular type of welding operation is widely used. However, the disclosed improved system and method for multi-pass computer controlled narrow-gap Electroslag welding applications may be used in a large variety of Electroslag and or Electrogas welding applications, as will be readily apparent to those skilled in the art.

Referring now to FIGS. 1-15, an embodiment for an improved system and method for multi-pass computer controlled narrow-gap Electroslag welding applications, the two heavy plate workpieces 200 and 202 to be welded are spaced ¾-Inch apart. The Vertaslag™ Electroslag apparatus and method of the '472 patent, the '159 patent, the '443 patent, and/or '715 Application are applicable to the system and method for multi-pass computer controlled narrow-gap Electroslag welding applications, and are incorporated by reference as if fully set forth in this application. The two heavy plate workpieces are bridged together on the bottom by a sump plate (where the molten weld puddle is formed). The two heavy plate workpieces 200 and 202 are bridged together on the top by welding a "square donut" plate that connects the two plates together. Water cooled, air-cooled copper shoes or articulated air-cooled copper shoes 20 (FIGS. 2, 6, 11), 30 (FIGS. 4, 5, 8, 9, 10), or a combination of 20 and 30 (FIG. 1), are attached to either side of the gap 60 to form a weld cavity 68. After the weld cavity is formed, a consumable guide tube 40 and welding wire(s) 50 are placed inside the weld cavity.

When making a multi-pass Electroslag weld using the system and method for multi-pass computer controlled narrow-gap Electroslag welding applications, a "Butt-weld copper shoe" 20 can be placed on one external side of the weld cavity and/or at least one "insert-weld copper shoe" 30 with dual cable gaskets 32 can be placed inside the weld cavity 68 to limit the width of each weld cavity 68 width. If the weld with for each pass is limited to 1.50-inches, the amount of heat input for each pass is reduced substantially. This method allows the welding operator to weld at a faster "Vertical Rate of Rise" (VRR), at a much lower voltage, thus substantially reducing the heat input. The result is a smaller HAZ, and a much smaller grain size.

The welding wire 50 is fed down two grooves in the consumable guide tube 40 to the weld puddle. The consumable guide tube 40 is connected to the welding machine via heavy duty copper power cables. When welding power is turned on, the consumable guide tube transfers the power amperage and voltage) necessary to make the weld. Prior to starting the weld cycle, a granular flux material is dumped into the weld cavity and falls to the bottom of the sump. When the welding wire starts to feed, an arc is struck in the sump area. The welding arc provides sufficient wattage during the weld start to melt the granular welding flux. The flux then becomes molten and floats on top of the molten weld metal. The molten flux is heated to approximately 3500 degrees Fahrenheit. Wire feeding through the molten flux is immediately melted and falls through the molten flux in droplet form to the molten steel puddle below the molten flux puddle. Since the molten flux is lighter than steel, it floats on top of the molten steel puddle.

Wire continues to feed and both the molten flux and molten steel puddles continue to rise. As the puddle rises, the molten flux, at 3500 degrees Fahrenheit, melts the surface of the two plate workpieces 200, 202 being joined. As the two puddles continue to rise, the molten weld metal begins to solidify, thus welding the two plate workpieces 200, 202 together at the complete narrow-gap Electroslag weld(s) 90.

VertaSlag (ESW-NG) welds, produced with a Square Wave AC welding power supply, employs superior control to produce better physical weld properties for NGI-ESW, ESW and ESW-NG welding processes. A variety of Square Wave AC powers supply designs are capable of producing acceptable NGI-ESW and/or ESW and/or ESW-NG multi-pass VertaSlag welds, including, but not limited to, SCR power supplies, IGBT power supplies, constant voltage power supplies, and DC power supplies connected "Electrode Positive" (DCEP)—also referred to as DC Reverse Polarity; and connected "Electrode Negative" (DCEN)—also referred to as DC Straight Polarity. Extensive research comparing Narrow Gap Electroslag welding (ESW-NG), using Constant Voltage DC welding power supplies as opposed with Square Wave AC welding power supplies has been compiled and reported.

Subsequent studies of welds made with Constant Voltage DC power supplies compare the heat generated by DCEP with DCEN. These studies show that welding with DCEP consistently ran much hotter than welding DCEN. It was further discovered that welding with the DC power supply always created a strong magnetic field that tended to pull the penetration of the weld puddle to one side or the other, depending on the direction of the magnet field.

NGI-ESW, ESW and ESW-NG welds using a square wave AC welding power supply tend to reduce or eliminate the magnetic field problem. Associated consumable guide tube assemblies no longer have a strong magnetic pull that tends to deflect the assembly from the center of the weld cavity—causing the guide tube to short circuit against the side-wall of the weld cavity, causing the weld to stop. When the guide tube is deflected, the weld penetration can be pulled in the direction of the bend. The Square Wave AC welding power supply reduced, or eliminated the magnetic field, and the weld tended to stay in the center, with balanced penetration on all sides of the weld cavity for NGI-ESW, ESW and/or ESW-NG, reducing or eliminating the potential to short-circuit and stop the process in the middle of the weld cycle.

It appears that any given Amperage and Voltage condition (wattage) input to the NGI-ESW or ESW molten flux, covering the molten steel welding puddle, substantially reduces the total heat input into the parent material. It further has been observed that the DCEP half cycle of the AC Square Wave produces higher heat input into the parent material, and the DCEN produces lower heat input into the parent material. Thus, setting the time cycle of the DCEP, as opposed to DCEN, allows the operator to adjust the heat input to the parent material. The controlled AC Square Wave for ESW more closely controls the shape of the weld bead. Accordingly, the amount of base metal dilution of the resultant weld puddle is significantly reduced.

The ESW and/or ESW-NG with Square Wave AC welding power supply better controls the weld bead shape, minimizes the base metal dilution, reduces the total heat input into the parent material, and the reduces or eliminates any magnetic field. The ESW and/or ESW-NG with Square Wave AC welding power supply for the first time uses a constant voltage Square Wave AC power supply to produce ESW welds, and ESW-NG welds.

One of the advantages of using air-cooled copper welding shoes, or articulated air-cooled copper welding shoes for the improved system and method for multi-pass computer controlled narrow-gap Electroslag welding applications is that the air flow can be adjusted during the welding operation to maintain a constant shoe temperature. The temperature of water cooled shoes cannot be allowed to go higher than 212 degrees Fahrenheit because at this temperature the heat starts generating steam, stopping the flow of water and, thus, melting the cooper shoes. The air-flow in the air-cooled copper shoe 20 or 30 allows the shoe temperature to go as high as 1000 degrees Fahrenheit. The air-cooled copper shoe temperature range for the preferred embodiment of automated system and method for multi-pass computer controlled narrow-gap Electroslag welding applications is 800 degrees Fahrenheit to 1000 degree Fahrenheit. When air-cooled copper welding shoes or articulated air-cooled copper welding shoes are allowed to operate in this temperature range, the high voltage necessary to get the weld to blend into the corners of the weld cavity can be substantially lowered, thus reducing the total heat input into the parent material and reducing he grain size in the weld metal.

The welding process and the welding procedures for improved system and method for multi-pass computer controlled narrow-gap Electroslag welding applications provides improved heat input calculations over single pass welds for heavy plate steel welding as depicted in FIG. 13. The calculated heat input values for single pass welds for 3 inch to 9 inch thick heavy plate workpieces ranges from 2,262 kilo-joules/inch to 12,168 kilo-joules/inch, respectively. The calculated heat input values for multi-pass welds for 3 inch to 9 inch thick heavy plate workpieces is a constant 969 kilo-joules/inch, since the multi-pass parameters are the same for this range of heavy plate thickness, FIG. 13. The system and method for multi-pass computer controlled narrow-gap Electroslag welding applications allows the welding operator to weld at a faster "Vertical Rate of Rise" (VRR), at a much lower voltage, thus substantially reducing the heat input. The result is a smaller HAZ, and a much smaller grain size providing consequently better impact values (Charpy), elongation, tensile strength, and yield.

Figure 15:
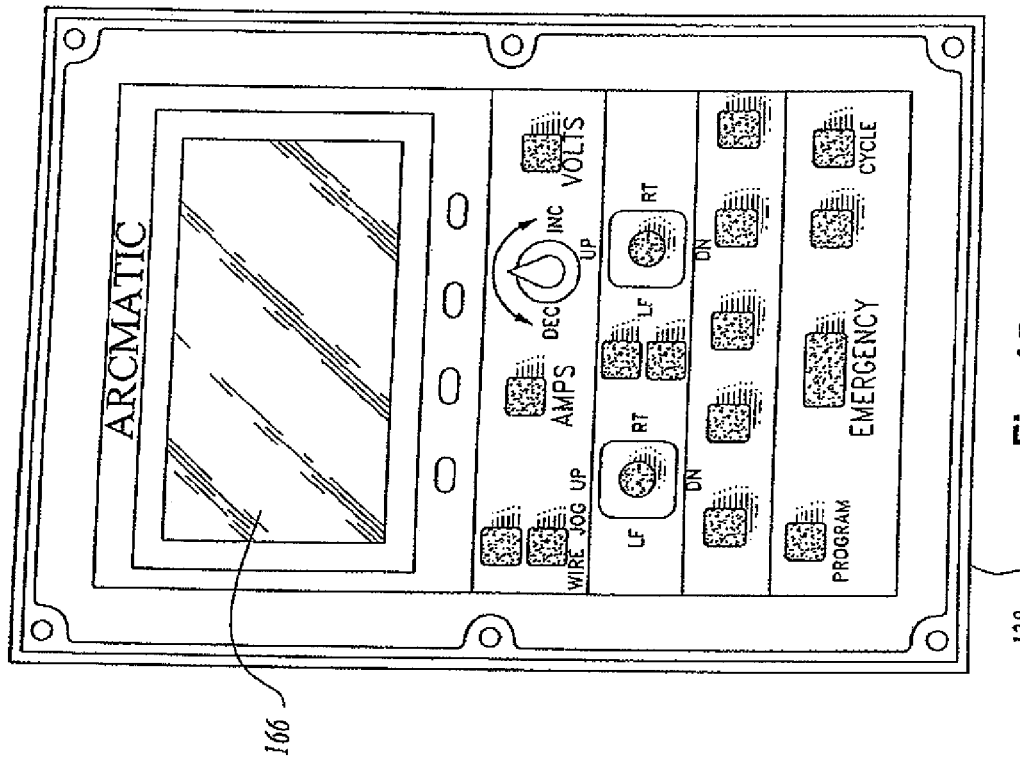
FIG. 15 is a front view of a representative operator's control panel 138 and LCD graphics panel 166 of FIG. 14.
Figure 14:
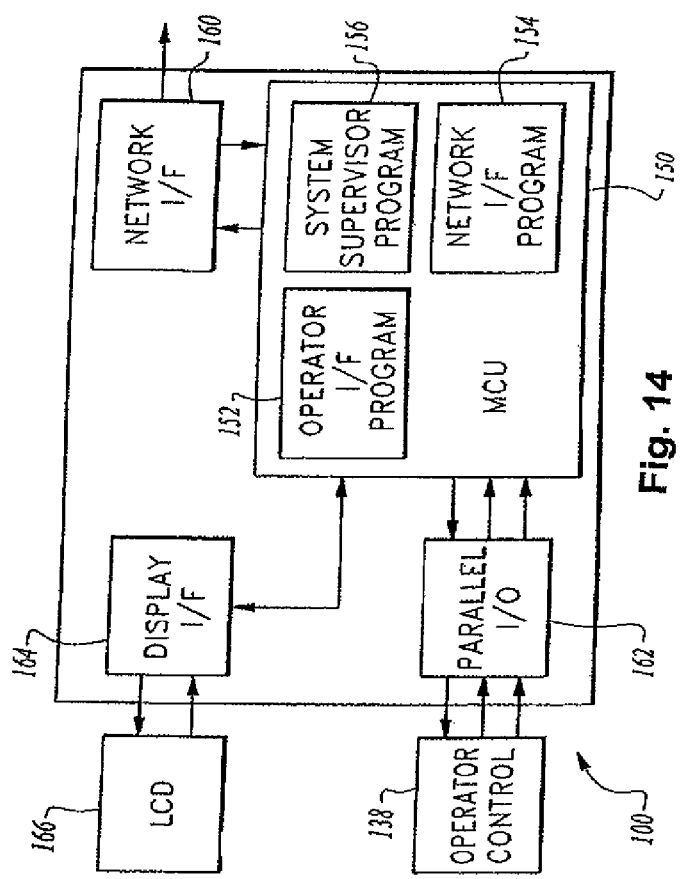
FIG. 14 is representative system schematic of operator's control interface 100 including the operator's control panel 138 and liquid crystal display (LCD) graphics panel 166, parallel input and output unit 162, display interface 164, microprocessor control unit 150, operator interface program 152, network interface program 154, system supervisor program 156, and network interface 160.

The welding process and the welding procedures for improved system and method for multi-pass computer controlled narrow-gap Electroslag welding applications can be pre-programmed into the Arcmatic™ programmable, computer controlled integrated welding system, FIGS. 14-15. The Arcmatic™ distributed welding control system 100 provides fully automatic control over the improved system and method for multi-pass computer controlled narrow-gap Electroslag welding applications from the operator's control panel 138. The automated control of the improved system and method for multi-pass computer controlled narrow-gap Electroslag welding application components includes a single pendant controller that provides overall system control for a number of discreet motion control networks including microprocessor modular distributed control of each welding torch, each welding torch slide assembly, water or air circulation through the copper shoes, each wire feed conduit, each high current welding cable, welding power supply, and each Electroslag weld within each welding cavity through a system supervisor program 156, network interface program 154, and an operator interface program 152 of a microprocessor control unit 150. Accordingly, the welding operator for any disclosed method and system of welding using the improved system and method for multi-pass computer controlled narrow-gap Electroslag welding applications principally needs to be a skilled operator capable of setting up the weld and running the pre-qualified welding programs. The same welding control system and methods used for Arcmatic™ VertaSlag™ welds of the '472 patent, the '159 patent, the '443 patent, and/or '715 Application, are used to operate and control the method and system of welding including, but not limited to, automating the improved system and method for multi-pass computer controlled narrow-gap Electroslag welding applications "on the job" in the field.

Therefore, the foregoing is considered as illustrative only of the principles of the invention. Additionally, since numerous modifications and changes will readily occur to those skilled in the art, it is not desired to limit the invention to the exact construction and operation shown and described, and further, all suitable modifications and equivalents may be resorted to, falling within the scope of the invention.

I claim:

1. An improved method for multi-pass computer controlled narrow-gap Electroslag welding applications comprising, the method comprising the following steps:
   a) providing at least one pair of workpieces having upper ends and lower ends, the workpieces positioned to be welded together defining a welding gap of uniform width between the at least one pair of workpieces and defining a welding gap height, the welding gap further defining a welding gap centerline and welding gap sides;
   b) providing at least one insert-weld air-cooled welding shoe inserted in the welding gap for the length of the welding gap height;
   c) providing at least one butt-weld air cooled welding shoe on the exterior of the welding gap for the length of the welding gap height;
   d) providing means for Electroslag welding within the welding gap between the at least one pair of workpieces, said means for Electroslag welding within the welding gap between the at least one pair of workpieces comprising at least one sump bridging the lower ends of the at least one pair of workpieces and serving as a basin for the welding gap width, at least one plate bridging the welding gap width at the at least one pair of workpieces upper ends, and at least one constant voltage, square wave AC welding power supply; and
   e) providing means for controlling Electroslag welding within the welding gap between the at least one pair of workpieces such that a heat transfer depth penetration from an Electroslag weld puddle to the workpieces follows a pre-determined profile resulting in a smaller heat affected zone and smaller grain structure in the weld metal and such that the magnetic field within the welding gap is reduced or eliminated allowing the weld to stay in the center of the welding gap with balanced penetration on all sides of the welding gap reducing or eliminating the potential to short-circuit and stop the process in the middle of a weld cycle and whereby all air-cooled welding shoes are maintained at a temperature range between 800 degrees Fahrenheit to 1000 degrees Fahrenheit during the Electroslag welding operation.

2. The improved method for multi-pass computer controlled narrow-gap Electroslag welding applications of claim 1, wherein a time cycle of the at least one constant voltage, square wave AC welding power supply is set to adjust the heat input to a parent weld material to more closely control the shape of a weld bead, and thus control base metal dilution of a resultant weld puddle.

3. The improved method for multi-pass computer controlled narrow-gap Electroslag welding applications of claim 1, wherein step e) further comprises the steps of:
   a) providing at least one system supervisor program;
   b) providing at least one network interface program;
   c) providing at least one operator interface program of a microprocessor control unit; and
   d) providing at least one operator's control panel.

4. A method of multi-pass computer controlled narrow-gap Electroslag welding allowing a faster vertical rate of rise at a much lower voltage, which method comprises selective Electroslag welding narrow-gaps within segments of a weld cavity between heavy plate steel workpieces and attendant automated control of the heat transfer depth penetration from the Electroslag weld puddle to the workpieces according to a pre-determined profile resulting in a smaller heat affected zone and smaller grain structure in the weld metal and reduction or elimination of the magnetic field within the weld cavity, the method comprising the steps of:
   a) providing two heavy plate workpieces positioned to define a uniform welding gap width between the workpieces and workpiece upper and lower ends;
   b) providing a computer controlled system for Electroslag welding within the welding gap between the at least one pair of workpieces, the system comprising (i) at least one sump bridging the lower ends of the at least one pair of workpieces and serving as a basin for the welding gap width, (ii) at least one plate bridging the welding gap width at the at least one pair of workpieces upper ends, (iii) a consumable guide tube and welding wire assembly, and (iv) at least one copper welding shoe;
   c) positioning at least one copper welding shoe to define a first partial weld gap cavity within the weld gap between workpieces;
   d) positioning the consumable guide tube at a centerline position within the partial weld gap cavity;
   e) completing an Electroslag weld within the first partial weld gap cavity;
   f) repositioning at least one copper welding shoe to define a next partial weld gap cavity within the weld gap between workpieces;
   g) completing an Electroslag weld within the first partial weld gap cavity;
   h) repeating steps f)-g) until the entire weld gap width between workpiece upper and lower ends has been closed by welds.

5. The method of claim 4, further comprising the steps of:
   a) providing a direct current—electrode positive square wave power supply;
   b) and setting the time cycle of the direct current—electrode positive square wave welding power supply to adjust the heat input to a parent weld material to more closely control the shape of a weld bead, and thus control base metal dilution of a resultant weld puddle such that the magnetic field within the weld cavity is reduced or eliminated allowing the weld to stay in the center of the weld cavity with balanced penetration on all sides of the weld cavity thus reducing or eliminating the potential to short-circuit and stop the process in the middle of a weld cycle.

6. The method of claim 4, whereby step b) further comprises the steps of:
   a) providing at least one air-cooled copper welding shoe on one narrow-gap side;
   b) controlling the air-cooled copper shoe temperature range between 800 degrees Fahrenheit and 1000 degrees Fahrenheit.

7. The method of claim 4, whereby step b) further comprises the steps of:
   a) providing at least one water-cooled copper welding shoe on one narrow-gap side;
   b) controlling the water-cooled copper shoe temperature range below 212 degrees Fahrenheit.

* * * * *